United States Patent [19]

Ohtani

[11] 4,210,410
[45] Jul. 1, 1980

[54] VOLUMETRIC TYPE FLOWMETER HAVING CIRCULAR AND INVOLUTE TOOTH SHAPE ROTORS

[75] Inventor: Iwao Ohtani, Inagi, Japan

[73] Assignee: Tokico Ltd., Kawasaki, Japan

[21] Appl. No.: 896,671

[22] Filed: Apr. 14, 1978

[30] Foreign Application Priority Data

Nov. 17, 1977 [JP] Japan .................................. 52-138231
Nov. 22, 1977 [JP] Japan .................................. 52-140292

[51] Int. Cl.² .......................... G01F 3/10; F01C 1/16; F04C 1/10
[52] U.S. Cl. ................................. 418/150; 418/201; 73/261
[58] Field of Search ............... 418/201, 206, 150, 202, 418/203; 73/261

[56] References Cited

U.S. PATENT DOCUMENTS

| | | | |
|---|---|---|---|
| 2,159,744 | 5/1939 | Maglott | 418/201 |
| 2,193,671 | 3/1940 | Dolza | 418/201 |
| 2,705,922 | 4/1955 | Rathman | 418/201 |
| 2,843,094 | 7/1958 | Berck | 418/201 |
| 3,164,099 | 1/1965 | Iyoi | 418/201 |

*Primary Examiner*—John J. Vrablik
*Attorney, Agent, or Firm*—Haseltine, Lake & Waters

[57] ABSTRACT

A volumetric type rotary machine has a pair of rotors each of which has a plurality of teeth comprising tooth crests and valleys alternately disposed at equal angular intervals around the rotor in profile in a cross-sectional plane thereof perpendicular to the rotational axis thereof, which rotors are adapted to rotate in mutually opposite directions in mutually intermeshed state. In each rotor as viewed in the profile in the cross-sectional plane, the tooth crests and valleys respectively have convex and concave arcuate parts over specific peripheral extents thereof centered on the vertices and nadirs thereof, respectively, and remainder parts of involute curve shape between the extremities of the arcuate parts.

3 Claims, 15 Drawing Figures

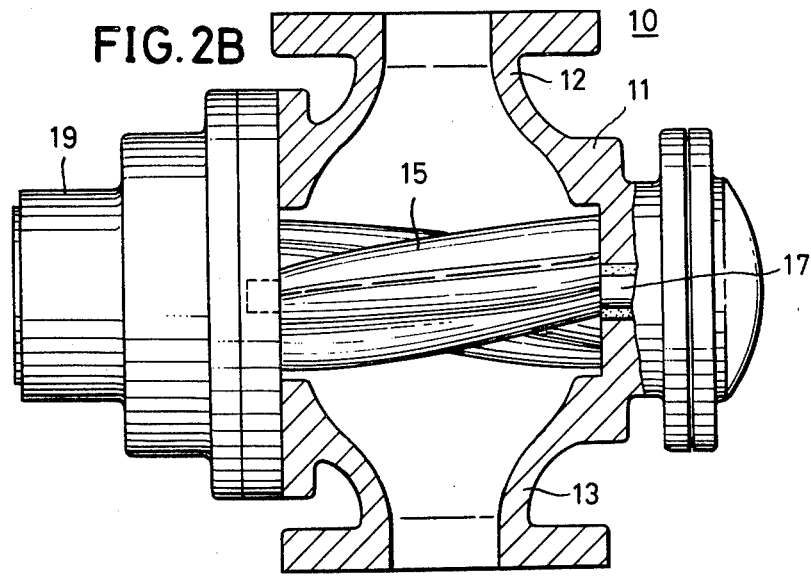
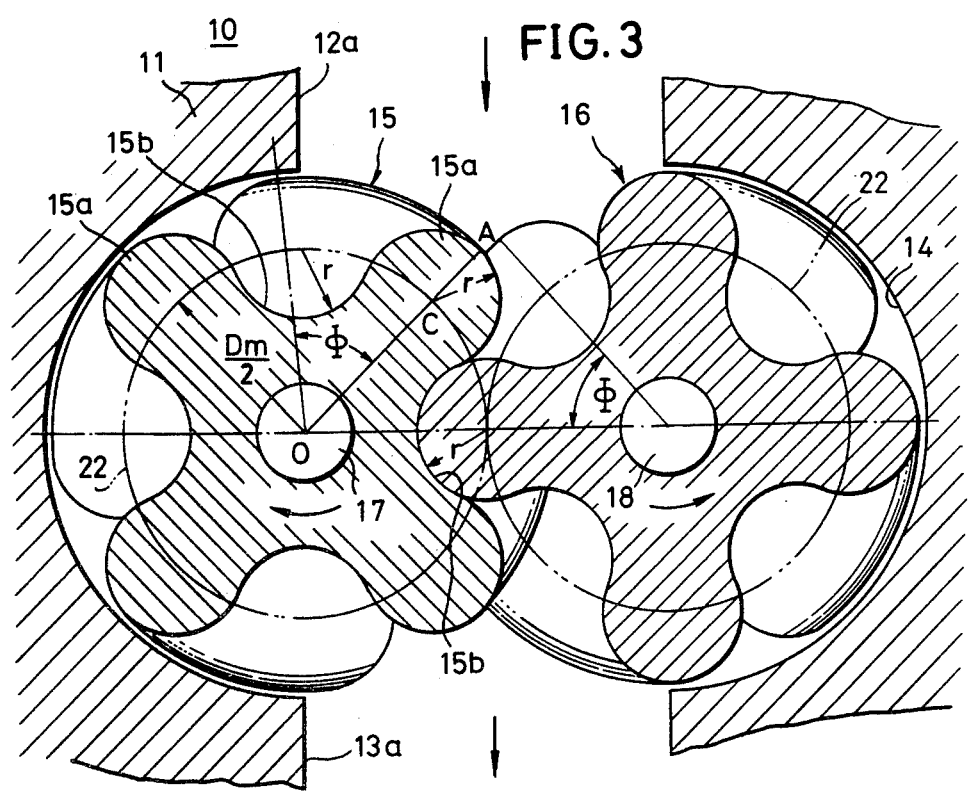

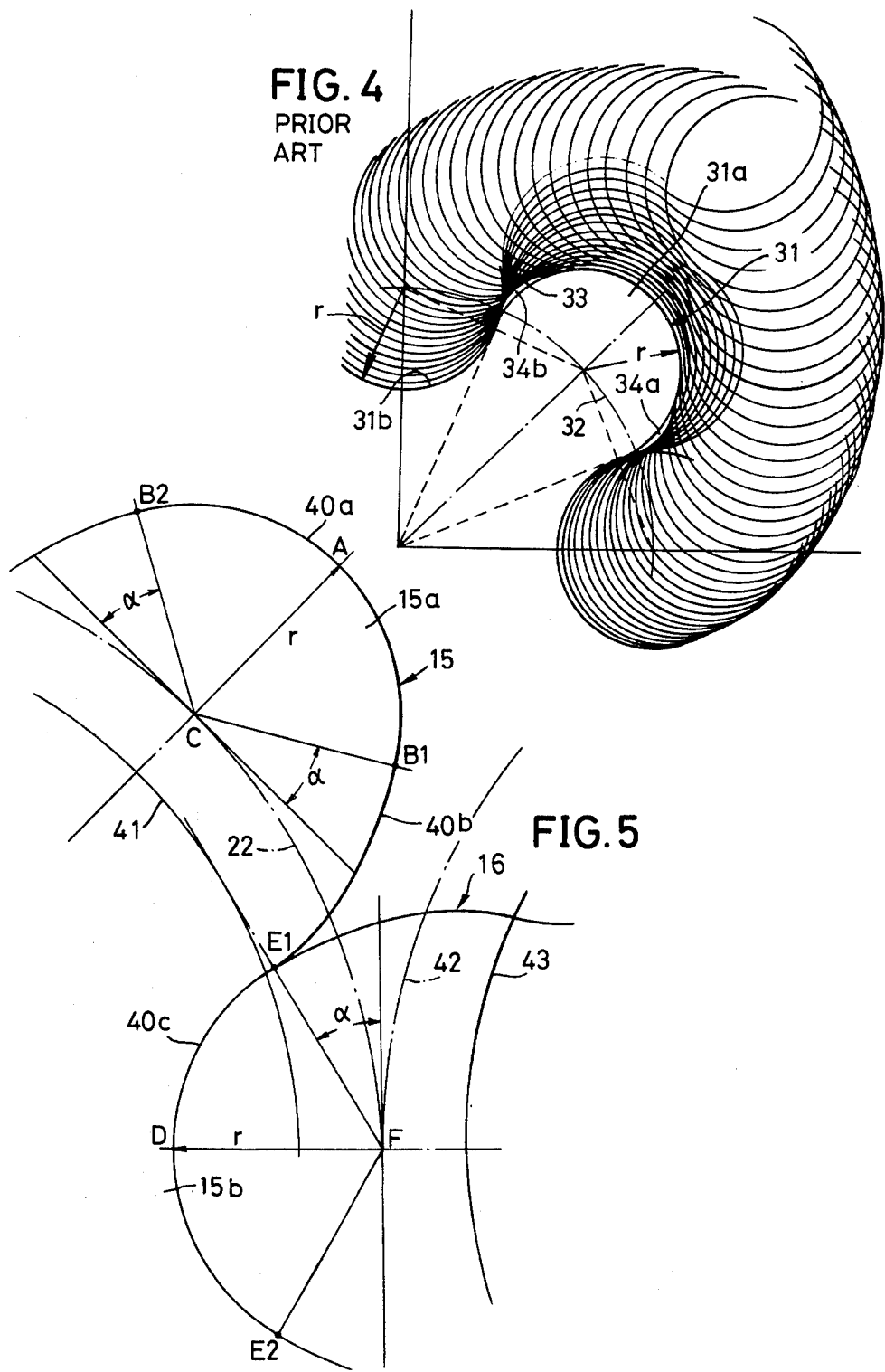

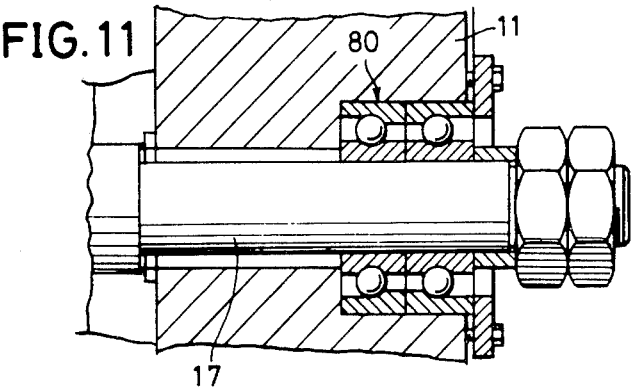
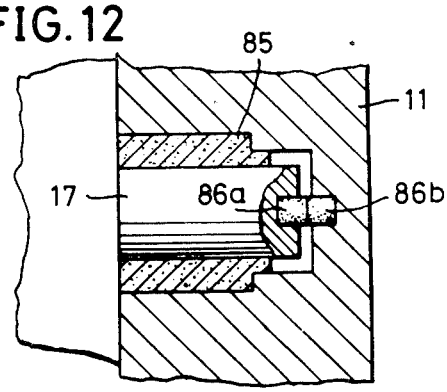
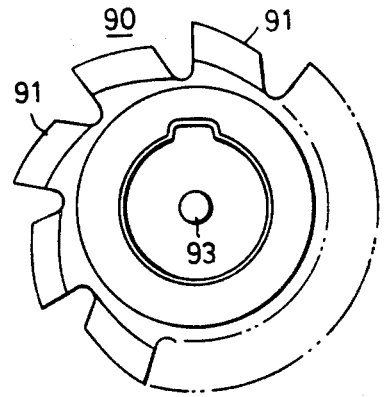
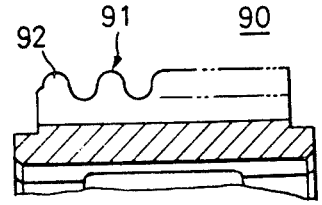

VOLUMETRIC TYPE FLOWMETER HAVING CIRCULAR AND INVOLUTE TOOTH SHAPE ROTORS

BACKGROUND OF THE INVENTION

The present invention relates generally to volumetric type rotary machines and more particularly to improvements in volumetric rotary machines of the kind having a pair of screw rotors each of which has a cross sectional shape of a toothed wheel with crests and valleys in planes perpendicular to the rotational axis and is twisted in its rotational axis direction, the two rotors rotating in mutually meshed state.

Heretofore, among rotary machines such as flowmeters, pumps, motors, fans, blowers, and compressors, there have been those having Roots type rotors, elliptical-gear type rotors, and the like. In a Roots type rotary machines, the rotors rotate smoothly even when the fluid flowing through the rotary machine lacks lubricity. Furthermore, in order to cause the rotors to rotate at equal rotational speed, the rotors are prevented from directly contacting each other, and, moreover, mutually meshing timing gears are respectively provided at the ends of the rotor shafts of the rotors. A problem accompanying this Roots type rotary machine is that, because of the necessity of providing timing gears therein in this manner, the machine becomes complicated and cannot be produced at low cost.

The above mentioned elliptical-gear type rotary machine does not require timing gears, but the fabrication of the rotors is very troublesome and costly since it is necessary to cut gear teeth on the elliptical rotors. Furthermore, the rotational speeds of the rotors are not equal, and the fluids handled by this machine are limited to those of lubricative nature.

Still another problem common to both of the above mentioned rotary machines is that a pulsative flow develops in the fluid which has passed through the machine as the rotors rotate as a result of the periodic release, on the outlet side, of the fluid which has been confined on the inlet side by the rotors between the rotors and the casing.

An example of a rotary machine having rotors of a shape differing from that of the above described rotors is the screw compressor having a pair of screw or helical rotors as proposed in the U.S. Pat. No. 3,986,801. This screw compressor has two screw rotors each of which, as viewed in cross section in a plane perpendicular to the rotational axis, has crests and valleys comprising circular arcs around its periphery at equal intervals and is helically twisted in the direction of the rotational axis. The crests and valleys of these screw rotors are directly meshed with each other, and these rotors thus rotate in the delivery direction when one of the rotors is positively driven in rotation from the outside. As a result, the fluid being compressed is sent in the rotational axis direction along the helical grooves of the screw rotors and is compressed as the meshing action of the screw rotors takes place.

Since the two screw rotors rotate in directly meshed state in this screw compressor, timing gears are unnecessary, and there is no necessity of forming small gears on the rotors. Accordingly, the compressor can be easily produced at low cost. Furthermore, since the fluid from the inlet side is sent in a relatively continuous manner to the delivery outlet side as the rotors rotate, whatever pulsative flow that develops in the fluid is very small, and the level of the noise generated is also very low.

Each rotor of this screw compressor, however, has a toothed profile in cross section wherein the peripheral figure of the tooth crests and tooth valleys comprise only circular arcs of the same radius. For this reason, and as described also hereinafter, a gap is formed as a natural result at the meshing parts of the pair of screw rotors. Consequently, the inlet side and the outlet side become directly communicative through this gap, whereby the performance of the machine as a compressor is not very high.

It appears that applications of the principle and mechanism of this screw compressor to other rotary machines such as a flowmeter, for example, were not conceived, but if they were applied to a flowmeter, the accuracy of flow measurement of such a flowmeter would be impaired by the above mentioned communicative gap.

The above described screw rotors are accompanied by other difficulties such as unequal rotational speeds of the rotors in the vicinity of the pitch point giving rise to slipping, rapid wear, and poor durability and difficulty in fabrication.

SUMMARY OF THE INVENTION

Accordingly, it is a general object of the present invention to provide a novel and useful volumetric type rotary machine having screw rotors in which the above described difficulties have been overcome.

Another and specific object of the invention is to provide a volumetric type rotary machine having rotors each of which has a helically twisted shape in its rotational axis direction and a cross-sectional toothed-wheel shape in a plane perpendicular to the rotational axis wherein the tooth crest parts and the tooth valley parts are respectively arcuate and joined continuously by involute curves interposed therebetween. By this feature according to the invention, a gap is not formed between the meshing parts of the pair of rotors, whereby a rotary machine of high performance is obtained. Furthermore, because of the provision of involute curves in the rotor cross-sectional profile, the two rotors undergo meshed rotation at equal speed, whereby slippage does not occur or is extremely small, and abrasive wear is small. In addition, the rotors can be easily machined.

Still another object of the invention is to provide a positive-displacement type rotary machine having rotors in which the edges of openings in the machine casing at the fluid inlet and outlet are formed with a shape such that it has the same inclination as the inclination of the seal line at the ends of the rotors, that is, an angle of inclination which is equal to the angle of twist of each rotor. By this feature of the rotary machine of the invention, the rotational resistance torque of the rotors is made low, and large cross-sectional areas of the openings at the fluid inlet and outlet can be obtained, whereby advantages such a low flow resistance are afforded.

Other objects and further features of the present invention will be apparent from the following detailed description when read in conjunction with the accompanying drawings.

BRIEF DESCRIPTION OF THE DRAWINGS

In the drawings:

FIGS. 2A and 2B are respectively a plan view with parts in horizontal longitudinal section taken along the line IIA—IIA in FIG. 1 as viewed in the arrow direction and a side elevation with parts in vertical longitudinal section taken along the line IIB—IIB in FIG. 1 as viewed in the arrow direction;

FIG. 3 is a cross section taken along the line III—III in FIG. 2A as viewed in the arrow direction;

FIG. 4 is a diagram for a description of the meshing of screw rotors known in the prior art;

FIG. 5 is an enlarged fragmentary diagram of one portion of the rotor profile shown in FIG. 3;

FIG. 11 is a side elevation, partly in vertical longitudinal section of one example of a bearing for supporting a rotor shaft used in the volumetric rotary machine of the invention;

FIG. 12 is a side elevation, partly in vertical longitudinal section, of another example of a bearing; and FIGS. 13A and 13B are respectively a front elevation and a side elevation of another example of a cutting tool for machining the screw rotors of the volumetric rotary machine of the invention.

DETAILED DESCRIPTION

Figure 1:
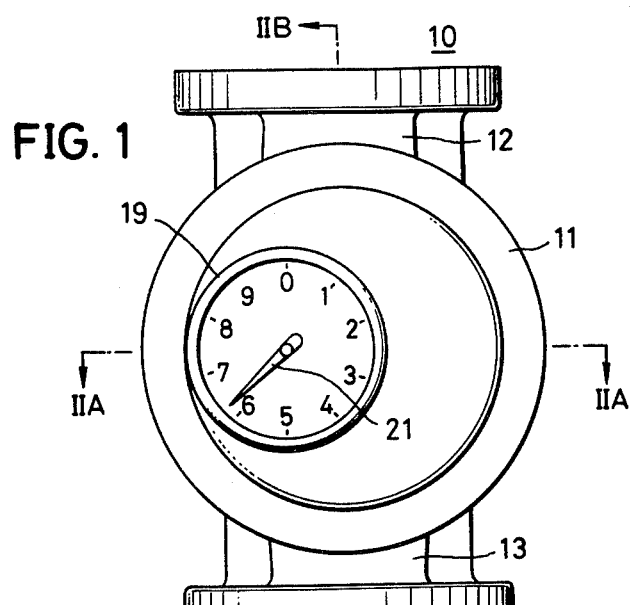
FIG. 1 is a front elevation showing the exterior of one example of a volumetric flowmeter embodying the volumetric rotary machine according to the invention.
Figure 2A:
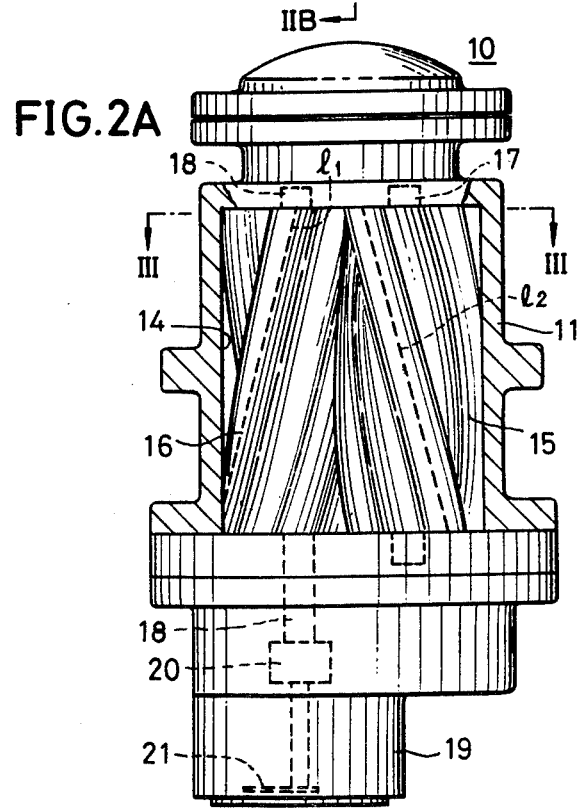

Referring to FIGS. 1, 2, and 3, the casing 11 of a volumetric type flowmeter 10 has a fluid inlet part 12 and a fluid outlet part 13 and has therewithin a rotor chamber 14. Within this rotor chamber 14, there are accommodated a pair of rotors 15 and 16 fixed respectively to rotor shafts 17 and 18, which are rotatably supported by bearings on the casing 11 and are perpendicular to the direction of fluid flow from the fluid inlet part 12 to the fluid outlet part 13. One end (here designated the front end) of the rotor shaft 18 of the rotor 16 extends through a side plate of the casing 11 and into a measurement and display section 19. This measurement and display section 19 has an indicating pointer 21 to which the rotation of the rotor shaft 18 is transmitted via a suitable speed-reducing mechanism 20, and which thereby indicates the flow quantity or flow rate.

Each of the rotors 15 and 16 in the present embodiment of the invention is of 4-blade type having four tooth crests and four tooth valleys in alternate arrangement at equal angular intervals around the periphery of the rotor. The entire peripheral shapes of these rotors 15 and 16 are such that their tooth crests and valleys are twisted with a total winding angle $\Phi$ in mutually opposite twist directions with respect to their rotational axis direction between the two ends of the rotors. In the present embodiment of the invention, the rotor 15 has a left-handed twist, while the rotor 16 has a right-handed twist.

The rotors 15 and 16 are directly meshed with each other and rotate in mutually opposite directions. For this reason, there is no necessity or providing mutually meshed timing gears respectively on the rotor shafts 17 and 18.

As these rotors 15 and 16 rotate, the fluid entering through an inlet 12a is confined between the groove (valley) shaped parts, including the tooth valley bottoms, of the rotors 15 and 16 and the inner wall surface of the rotor chamber 14 of the casing 11 and subsequently reaches the outlet 13a, flowing out therethrough. While each of the rotors 15 and 16 rotates through one revolution, there is little pulsation in the flow of fluid flowing out of the outlet 13a. For this reason, the flowmeter has a low rate of instrument error, that is, high accuracy, even in the low flow rate range.

Since the cross section shapes of the rotors 15 and 16 are the same in a plane perpendicular to the rotor shafts 17 and 18, the shape of only one rotor 15, will be described hereinbelow. The shape of the central part and nearby parts of each tooth crest 15a of the rotor 15 have a convex shape of an arc of a circle of radius r with its center on a pitch circle 22 of a diameter Dm, the arc being outside of the pitch circle 22. Furthermore, the shape of the central part and neighboring parts of each valley bottom 15b have a concave shape of an arc of a circle of radius r with its center on the pitch circle 22, this arc being inside of the pitch circle 22. Therefore, the outer diameter D of the rotor is expressed as $D = Dm + 2r$, and the inner diameter Di, that is, the minimum diameter of the rotor at its valley bottom part, is expressed as $Di = Dm - 2r$. The above described arc of each tooth crest and the arcs of the valley bottoms on each side thereof are joined by involute curves as described hereinafter.

Here, the number of tooth crests 15a or lobes will be denoted by Z (which is 4 in the present embodiment of the invention), the transverse contact ratio of the rotors 15 and 16 by x, and the aforementioned total winding angle by $\Phi$. Then $\Phi/(\pi/2) + x > 1$, and $\Phi > (2\pi/Z)(1-x)$. Furthermore, $\phi > \cot^{-1}(2L)/(Dm\Phi)$, where L is the length of the rotor in the rotational axis direction, and $\phi$ is the helix angle. For example, in the cases where the transverse contact ratio x is 0.5, and the quantity of 2L/Dm is 0.5, 0.75, and 1.0, respectively, the values of the helix angle $\phi$ are made greater than 21°, 15°, and 11°, respectively. Accordingly, the helix angle $\phi$ is selected at a value within the range of approximately 10° to 25°.

As indicated in FIG. 4, each tooth crest 31a in entirety and each tooth valley 31b in entirety of the cross-sectional profile of a known screw rotor 31 are composed of only arcs of circles of the same radius r having their centers on a pitch circle 32, the circular arc of each tooth crest 31a joining directly the circular arcs of the tooth valleys 31b on opposite sides thereof.

For this reason, when a pair of screw rotors of this known shape are intermeshed and rotated, the curve which one screw rotor (first screw rotor) rotating in contact with the peripheral surface of the other (second) screw rotor 31 generates becomes as indicated by curve 33. As is apparent from this curve 33, the above mentioned first screw rotor conforms substantially to the arcuate shape of the second rotor 31, but gaps 34a and 34b are formed in the vicinity of the points where the circular arc of the tooth crest 31a join those of the tooth valleys 31b. Consequently, in the case where these known rotors are used in a flowmeter, the inlet 12a and the outlet 13a become communicative through these gaps 34a and 34b, whereby there arise the various problems mentioned hereinbefore such as large instrument error.

Accordingly, the present invention provides a pair of rotors in which, the difficulties accompanying the above described known rotors have been overcome, and which are of a shape such that they intermesh smoothly and intimately over their entire surfaces without forming therebetween gaps as described above.

Next, the cross-sectional tooth shape of the rotors 15 and 16 will be described in conjunction with FIGS. 3 and 5. Each tooth crest 15a of each rotor 15, in cross section, is in the form of a convex arcuate part 40a of the shape of an arc of a circle of radius r having its center at the intersection point C of the pitch circle 22 and a straight line passing through the vertex point A of the tooth crest 15a and the center O of the pitch circle 22, the arc including the vertex A and extending between points B1 and B2, which are equidistant from the vertex A on opposite sides thereof. These points B1 and B2 are at angular positions which are at equal pressure angles $\alpha$ from the tangent to the pitch circle 22 at the point C toward the vertex A. Therefore, the angle between these angular positions of the points B1 and B2 is equal to $(180° - 2\alpha)$.

Each tooth valley 15b is in the form of a concave arcuate part 40c of the shape of an arc of a circle of the radius r having its center at the intersection point F of the pitch circle 22 and a straight line passing through the nadir or center point D of the tooth valley 15b and center O of the pitch circle 22, the arc including the center point D and extending between points E1 and E2, which are equidistant from the center point D on opposite sides thereof. These points E1 and E2 are at angular positions which are at equal pressure angles $\alpha$ from the tangent to the pitch circle 22 at the point F toward the center point D. Therefore, the angle between these angular positions of the points E1 and E2 is equal to $(180° - 2\alpha)$.

The part of the tooth or lobe of the rotor 15 between the points B1 and E1, in cross section, is in the form of an involute curve part 40b conforming to an involute curve, the base circle of which is a circle 41. In this connection, it will be obvious that the above mentioned point F is also on the pitch circle 42 of the other rotor 16, and that, furthermore, the straight line passing through the points E1 and F is coincident with the line of action constituting a tangent of the base circle 41 and of a base circle 43 with respect to the involute curve part of the rotor 16.

When the module in the plane of rotation is denoted by $Ma(=Dm/Z)$, the radius r of the arcuate part is expressed by $r = (\pi/Z) \cdot Ma \cdot \cos \alpha$. Furthermore, the diameter Dg of the base circle 41 and the diameter Dm of the pitch circle have the mutual relationship $Dg = Dm \times \cos \alpha$.

Because of the above described shape of the rotors 15 and 16 in the rotary machine of the present invention, when these rotors are rotated in mutually intermeshed state, gaps are not formed therebetween as in the example of the known machine, and the rotors contact each other smoothly and closely over their entire peripheral surfaces. Accordingly, there is no leakage of the fluid, and when the machine is adapted to function as a flowmeter, the instrument error is small. Furthermore, since the rotors rotate in smooth contact with each other, there is little vibration and noise, and the rate of abrasive wear, which is uniform, is very low.

Figure 6:
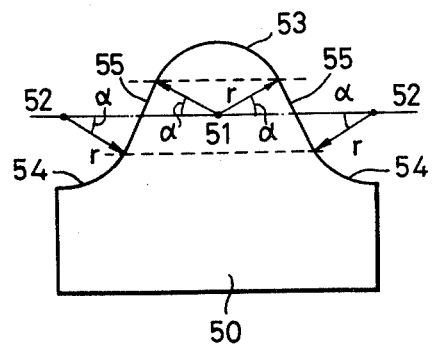
FIG. 6 is diagram showing the tooth form of one example of a cutting tool for machining the rotors of the volumetric rotary machine of the invention.

For machining and forming the rotors 15 and 16 of the above described shape, a cutting tool as shown in FIG. 6 is used. The cutting tool 50 has a profile made up of convex and concave arcs 53 and 54 of radius r with center points 51 and 52 on a common straight line, each of the arcs 53 and 54 terminating at points respectively corresponding to the pressure angle $\alpha$, that is, points at angular positions on the circles of the arcs that are apart by the angle $\alpha$ from the common straight line, and straight-line parts 55 jointing the ends of the convex arc 53 to the nearest ends of the concave arcs 54.

Figure 7:
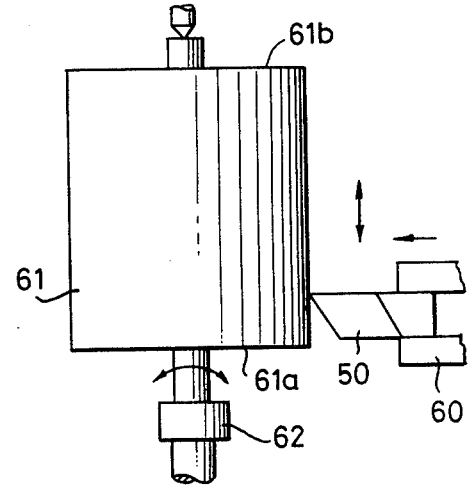
FIGS. 7 and 8 are respectively a side elevation and a plan view indicating the state of machining a screw rotor with the cutting tool illustrated in FIG. 6.
Figure 8:
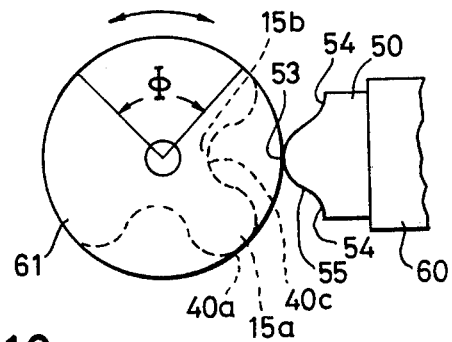

As indicated in FIGS. 7 and 8, the cutting tool 50 is mounted on a tool rest 60 which is adapted to move translationally up and down and left and right. A work 61 comprising a cylindrical stock material to be machined into a rotor is mounted on a main shaft 62, by which the work 61 is caused to undergo repeated reciprocating rotation within an angular range equal to the aforementioned total winding angle $\Phi$. In the machining operation while the work 61 is thus rotated in one direction through the angle $\Phi$ as the tool 50 is pressed against the cylindrical surface of the work 61, the tool 50 is simultaneously moved upwards from the lower end 61a to the upper end 61b of the work 61 thereby to accomplish cutting. Then, while the work 61 is rotating in the reverse direction, the tool 50 is moved downwards. Thereafter, as the tool 50 is advanced by increments equal to the depth of cut, the oscillatory rotation of the work 61 and the up and down movement of the tool 50 are repeated thereby to machine one groove (or tooth valley) part and one half tooth crest part on each side of the groove part.

Thereafter, the work 61 is reset by turning it successively through a specific angle (which is 90° in the present embodiment of the invention since the rotor is to have four blades or lobes), and the machining operation as described above is carried out for each resetting.

In the above described machining, the concave arcuate part 40c of the tooth valley 15b and the convex arcuate part 40a of the tooth crest 15a of the rotor 15 are formed respectively by the convex and concave arcuate parts 53 and 54 of the cutting tool 50, and the involute curve parts 40b of the rotor 15 are formed by the straight-line parts 55 of the tool. When the helix angle is small, the rotors 15 and 16 of mutually opposite directions of helical twist can be machined with the same cutting tool 50. Since, as described above, the cutting tool for machining the rotors 15 and 16 have a simple profile made up of merely arcuate parts and straight lines, the rotors can be produced at low cost.

In the design of these rotors, it is necessary that the pressure angle $\alpha$ satisfy the relationship $\alpha \geq \tan^{-1}(\pi/2Z)$ in order to prevent undercutting at the time of machining. Therefore, in the case where Z=4 as in the present embodiment of the invention, the lower limiting value of the pressure angle $\alpha$ which will not give rise to undercutting is approximately 21.44°. Thus, the lower limiting value of the pressure angle $\alpha$ not giving rise to undercutting is determined by the equation $\alpha = \tan^{-1}(\pi/2Z)$. The upper limiting value of this pressure angle $\alpha$ is determined by the range within which the flow rate can be made high, in practice, since the flow rate cannot be made high when the pressure angle $\alpha$ becomes large. For example, in the case where Z=4, it is desirable that the pressure angle $\alpha$ be selected to satisfy the relationship $21° < \alpha < 30°$.

In the above described embodiment of the invention, the number of teeth or lobes on each of the rotors 15 and 16 is four, but this number is not thus limited and may be three or more than four. In the case where the number of teeth is three, however, the total winding angle Φ, from the equation set forth hereinbefore, becomes $\Phi > (2\pi/3)(1-x) \approx 60°$. In the case where the rotor chamber 14 of the casing 11 is of semicircular arcuate shape, the inlet 12a and the outlet 13a become short-circuited, or communicative, through the helical grooves of the rotors, and the machine does not operate as a rotary machine. In this case, therefore, this problem can be solved by changing the shape of the rotor chamber 14.

One example of a casing embodying the invention for accommodating the above described rotors 15 and 16 will now be described with reference to FIGS. 9 and 10. If the edge parts of the openings of the inlet 12a and the outlet 13a of the casing of the flowmeter 10 embodying the invention are parallel to the rotational axes of the rotors, the rotational resistance torque of the rotors will be high because, as the seal lines of the vertices of the tooth crests of the rotors traverse these edge parts, they successively shear the fluid. This problem is solved in the present embodiment of the invention.

Figure 9:
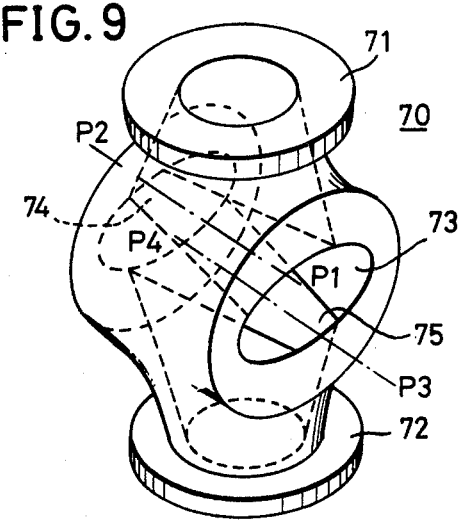
FIG. 9 is a perspective view of an embodiment of the casing of a volumetric rotary machine according to the invention.

Referring to FIG. 9, this casing 70 has a fluid inlet part 71, a fluid outlet part 72, and a rotor chamber 73 for accommodating the rotors 15 and 16 in a manner permitting them to rotate freely. The fluid flow paths of the fluid inlet part 71 and outlet part 72 communicate with the interior of the rotor chamber 73 respectively through an inflow port 74 and an outflow port 75.

Figure 10:
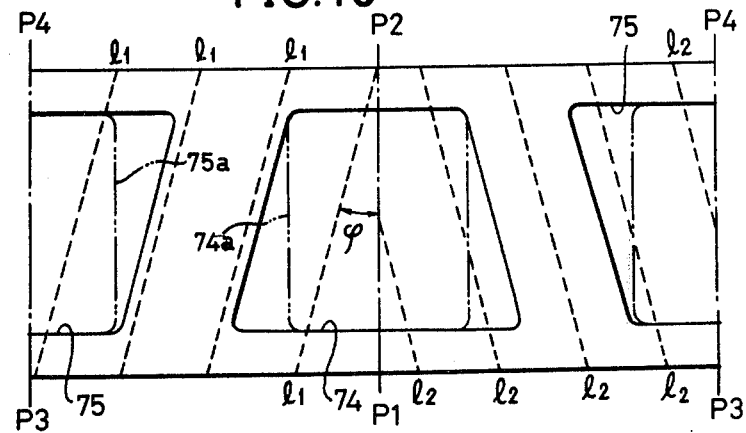
FIG. 10 is a development showing the shape of the fluid inlet and outlet openings of the casing shown in FIG. 9.

As is apparent from the development shown in FIG. 10, the side edges of the inflow port 74 and the outflow port 75 on one side thereof are inclined relatively to the respective centerlines P1-P2 and P3-P4 thereof by an angle equal to the helix angle $\phi$ of the rotor 15 in conformance with the seal lines $l_1$ of the vertices of the tooth crests of the rotor 15. The side edges of the inflow and outflow ports 74 and 75 on the other side thereof are inclined relatively to the respective centerlines P1-P2 and P3-P4 thereof by an angle equal to the helix angle $\phi$ of the rotor 16 in conformance with the seal lines $l_2$ of the rotor 16. Accordingly, the inflow and outflow ports 74 and 75 are symmetrical with respect to their respective centerlines P1-P2 and P3-P4 and, moreover, are of trapezoidal shapes with mutually reversed up-and-down orientation.

In the case where the inflow and outflow ports 74 and 75 are of rectangular shape as outlined by two-dot chain lines 74a and 75a, the seal lines $l_1$ and $l_2$ shear the fluid with the side edges parallel to the centerlines P1-P2 and P3-P4. For this reason, the rotational resistance torque becomes high.

In contrast, in the casing 70 of the present embodiment of the invention, the seal lines $l_1$ and $l_2$, in entirety, traverse the inclined edges of the inflow and outflow ports 74 and 75 in one action. As a consequence, the fluid is sealed in at one time between the grooved parts of the rotors 15 and 16 and the inner wall surface of the rotor chamber 73 of the casing 70. Therefore, there is no pressure loss due to gradual sealing of the fluid, and the rotational resistance to which the rotors 15 are subjected is very low.

Examples of bearings of the rotor shafts 17 and 18 of the rotors 15 and 16 will now be described in conjunction with FIGS. 11 and 12. The rotors 15 and 16 are subjected to an axial force, i.e., a thrust force, when they rotate in intermeshed state because their teeth, that is, their crests and valleys are of helical form wherein they are twisted with respect to rotational axis direction. In the above described embodiment of the invention, as the rotors 15 and 16 rotate, a thrust force is imparted thereto toward the side opposite to the side of the aforementioned measuring and indicating section 19 shown in FIGS. 2A and 2B. Accordingly, bearing means for rotatably supporting the rotor shafts against radial force and thrust force are provided on this opposite side.

Referring to FIG. 11, the end of the rotor shaft 17 on the above mentioned opposite side is journaled by combined angular ball bearings 80, which rotatably supports the end of the rotor shaft 17 against displacement in the radial direction and in the axial or thrust direction. In the example illustrated in FIG. 12, the end of the rotor shaft 17 is rotatably supported in the radial direction by a plain journal bearing 85 made of carbon. In addition, a sliding bearing member 86a of cylindrical shape made of tungsten carbide is provided coaxially at the center of the extremity of the rotor shaft 17. This sliding bearing member 86a coaxially abuts another sliding bearing member 86b similarly of cylindrical shape made of tungsten carbide and supported by the casing 11. The sliding bearing members 86a and 86b thus function cooperatively in mutually abutting and sliding state to support the rotor shaft 17 against thrust loads.

Another example of a cutting tool for machining the rotors 15 and 16 of the above described shapes is shown in FIGS. 13A and 13B. This is a rotating cutting tool 90 having a plurality of cutting blades 91 at equal intervals around its entire outer periphery. Each cutting blade 91 has a plurality of teeth 92 in the form of crests with intervening valleys in the direction parallel to a rotational shaft 93 of the tool 90. The teeth 92 are in the form of a continuous row of teeth each of the shape of the cutting tool 50 shown in FIG. 6.

In the machining of a work comprising a cylindrical stock material with this cutting tool 90, the cutting tool 90 is so set relative to the work that the rotational axis of the tool 90 is slightly deflected from the direction perpendicular to the rotational axis of the work. The work is continuously rotated in one direction. The cutting tool 90 is also rotated continuously in one direction and, in this state, is fed at low speed in the direction parallel to the rotational axis of the work. By the use of this cutting tool 90 in this manner, the machining of a rotor can be accomplished with very high efficiency and in a short time without the necessity of movements such as the oscillatory rotation of the work and the up-and-down reciprocation of the cutting tool as in the case of the tool 50 shown in FIG. 6.

Further, this invention is not limited to these embodiments but various variations and modifications may be made without departing from the scope of the invention.

What is claimed is:

1. In a volumetric type flowmeter having a pair of rotors each of which has a plurality of teeth comprising tooth crests and valleys alternately disposed at equal angular intervals around the rotor in profile in a cross-sectional plane thereof perpendicular to the rotational axis thereof, said rotors being adapted to rotate in mutually opposite directions in mutually intermeshed state, in each rotor as viewed in said profile in said cross-sectional plane, said tooth crests and valleys respectively having convex and concave arcuate parts over specific peripheral extents thereof centered on the vertices and nadirs thereof, respectively, and remainder parts of involute curve shape between the extremities of said arcuate parts, the improvement comprising: each of said specific peripheral extents of the tooth crests and valleys being peripheral length of an arc of a circle with the center thereof on the pitch circle of said teeth, said arc having an angular extent of $(180-\alpha)$ degrees, $\alpha$ being the pressure angle, and having a central point coinciding with the tooth crest vertex in the case of a tooth crest and with the nadir point in the case of a valley; the number of said teeth being 4, and the pressure angle $\alpha$ being selected at a value in the range of $21° < \alpha < 30°$; each tooth of each rotor being helically twisted in shape with a total winding angle $\Phi$ with respect to the rotational axial direction of the rotor, said angle $\Phi$ is selected at a value greater than $(2\pi/4)(1-x)$, where x is the transverse contact ratio of the pair of rotors; and each tooth of each rotor being helically twisted with a helix angle $\phi$ selected at a value equal to $\cot^{-1}(2L/D_m\Phi)$, where L is the length of the rotor in the direction of the rotational axis thereof, and $D_m$ is the diameter of the pitch circle.

2. A volumetric type flowmeter as claimed in claim 1 wherein the helix angle $\phi$ is selected at a value in the range of $10° \leq \phi \leq 25°$.

3. A volumetric type flowmeter as claimed in claim 1 and further comprising a casing having a rotor chamber in which the pair of rotors are rotatably accommodated and having inflow and outflow ports respectively for flow of a fluid into and out of said rotor chamber, and each of said inflow and outflow ports having opposed side edges which are inclined by an angle equal to said helix angle $\phi$ relative to said rotational axial direction.

* * * * *